United States Patent [19]
Verkleeren

[11] Patent Number: 5,333,576
[45] Date of Patent: Aug. 2, 1994

[54] NOISE ATTENUATION DEVICE FOR AIR INDUCTION SYSTEM FOR INTERNAL COMBUSTION ENGINE

[75] Inventor: Ronald L. Verkleeren, Belle Vernen, Pa.

[73] Assignee: Ford Motor Company, Dearborn, Mich.

[21] Appl. No.: 44,438

[22] Filed: Mar. 31, 1993

[51] Int. Cl.$^5$ .............................................. B60K 13/02
[52] U.S. Cl. ............................ 123/184.53; 123/184.57
[58] Field of Search .......... 123/52 M, 52 MB, 52 MC

[56] References Cited

U.S. PATENT DOCUMENTS

| | | | |
|---|---|---|---|
| 4,538,556 | 4/1984 | Takeda . | |
| 4,539,947 | 9/1985 | Sawada et al. | 123/52 M |
| 4,735,177 | 4/1988 | Koike | 123/52 MC |
| 4,854,270 | 8/1989 | Melde-Tuczai et al. | 123/52 M |
| 4,862,840 | 9/1989 | Matsunaga et al. | 123/52 M |
| 4,945,865 | 8/1990 | Lee | 123/52 M |
| 5,000,130 | 3/1991 | Yamada | 123/52 MB |
| 5,096,010 | 3/1992 | Ojala et al. . | |
| 5,163,387 | 11/1992 | Lee | 123/52 M |

Primary Examiner—E. Rollins Cross
Assistant Examiner—M. Macy
Attorney, Agent, or Firm—Damian Porcari; Roger L. May

[57] ABSTRACT

A pressure actuated noise attenuation device for an air induction system of an internal combustion engine is disclosed, comprising a quarter-wave tube and a tuning body movably mounted within the quarter-wave tube. The quarter-wave tube has an open first end in fluid communication with an air intake passage of the air induction system. The tuning body is movable by vacuum developed within the air induction system during operation of the internal combustion engine. The tuning body is also optionally acted upon by a biasing force and/or gravity. The tuning body is movable between at least a first position establishing a first operative length for the quarter-wave tube for attenuating air induction system noise at a frequency which is significant for a first engine operating level, to a second position corresponding to a second engine operating level. In its second position, the tuning body may either establish a second operative length for the quarter-wave tube for attenuating noise at a second frequency, or may substantially close the quarter-wave tube to deactivate the noise attenuation device.

16 Claims, 3 Drawing Sheets 5,333,576

NOISE ATTENUATION DEVICE FOR AIR INDUCTION SYSTEM FOR INTERNAL COMBUSTION ENGINE

TECHNICAL FIELD

The present invention is directed to a noise attenuation device for an air induction system of an internal combustion engine. More particularly, the invention is directed to a noise attenuation device having variable frequency noise reduction.

BACKGROUND OF THE INVENTION

It is well known to employ silencers, such as quarter-wave tuners and other resonators, to reduce air induction noise created by the air induction system of an internal combustion engine. Such air induction systems generally comprise an air cleaner and prior approaches have often employed a resonator or the like incorporated into the air cleaner or communicating with an air intake passage downstream thereof. Typically, such noise reduction systems attenuate noise at only a fixed narrow frequency range. The dominant noise frequency produced by an air induction system (or, in any event, the frequency most desirably attenuated) is different, however, at different engine operating levels. Such prior, fixed narrow frequency range noise reduction devices tuned for a first engine operating level may be substantially ineffective, or even counter-effective, at other significant frequencies, most notably at a dominant noise frequency produced by the air induction system at a second engine operating level.

Attempts to overcome the problem of fixed narrow frequency range noise reduction devices have included proposals for use of electronically actuated controls, for example, electronically actuated valves to turn a resonator on and off. A noise reduction device is shown in U.S. Pat. No. 4,538,556 to Takeda, wherein a tank communicates at two spaced ports with an air intake tube of an air induction system. One port is opened and closed by a vacuum actuated valve. The vacuum is supplied to the valve from a vacuum tank through a solenoid valve. An electronic signal, based on engine speed or other engine operating condition, actuates the solenoid valve to open or close fluid communication between the vacuum tank and the vacuum actuated valve. Electronic controls add expense and complexity to noise reduction devices for air induction systems.

A noise reduction device for the air induction system of an internal combustion engine is disclosed in Ojala et al There, a noise reduction side-branch reactive silencer is formed within a sub-frame interposed between the engine and a vehicle body. The sub-frame forms the reactive cavity and has a connector for communicating the reactive cavity with the air induction system. The connector is positioned along the sub-frame in accordance with the desired attenuation frequency. This system, while innovative and effective, is not directed to providing variable frequency noise reduction.

SUMMARY OF THE INVENTION

In accordance with the present invention, a noise attenuation device is provided for an air induction system of an internal combustion engine. The noise attenuation device comprises a quarter-wave tube having an open first end for fluid communication with an air intake passage of the air induction system. A tuning body is movably mounted within the quarter-wave tube. Specifically, the tuning body is movable within the tube by vacuum developed within the air induction system during operation of the engine. More specifically, the tuning body is movable from a first position within the quarter-wave tube to at least one other position. In the first position, the tuning body establishes a first operative length for the quarter-wave tube effective to attenuate noise at a first frequency which is significant at a given engine operating level. The second position of the tuning body within the quarter-wave tube corresponds to a second operating level of the engine.

The pressure difference between atmospheric and the vacuum created in the air induction system is used to move the tuning body, for example, a sphere or piston disc, within the quarter-wave tube to perform such functions. Typically, the pressure drop or vacuum created within an engine's air induction system is different at different engine operating levels. Typically, also, the dominant noise frequency generated by the air induction system differs at different engine operating levels. It is a novel and significant advantageous feature of the present invention that it takes advantage of such different vacuum levels to control a movable tuning body within a quarter-wave tube to provide variable noise reduction at different engine operating levels.

In accordance with certain preferred embodiments of the invention, the position of the tuning body is continuously variable between two positions to establish a correspondingly continuously variable operative length for the quarter-wave tube effective to attenuate noise at a corresponding continuum of frequencies. In accordance with certain preferred embodiments, the tuning body is movable to a position which effectively closes the quarter-wave tube to deactivate the noise attenuation device. Thus, the present invention uses pressure drop or vacuum created in the air induction system to move a tuning body within a quarter-wave tube to change the attenuating frequency of the quarter-wave tube, to active/deactivate the quarter-wave tube, or to provide both these features.

Additional features and advantages of certain preferred embodiments of the invention will be apparent to those skilled in the art from the following more detailed description.

BRIEF DESCRIPTION OF THE DRAWINGS

The following detailed description of certain preferred embodiments of the invention is provided with reference to the attached drawings, wherein.

Figure 1:
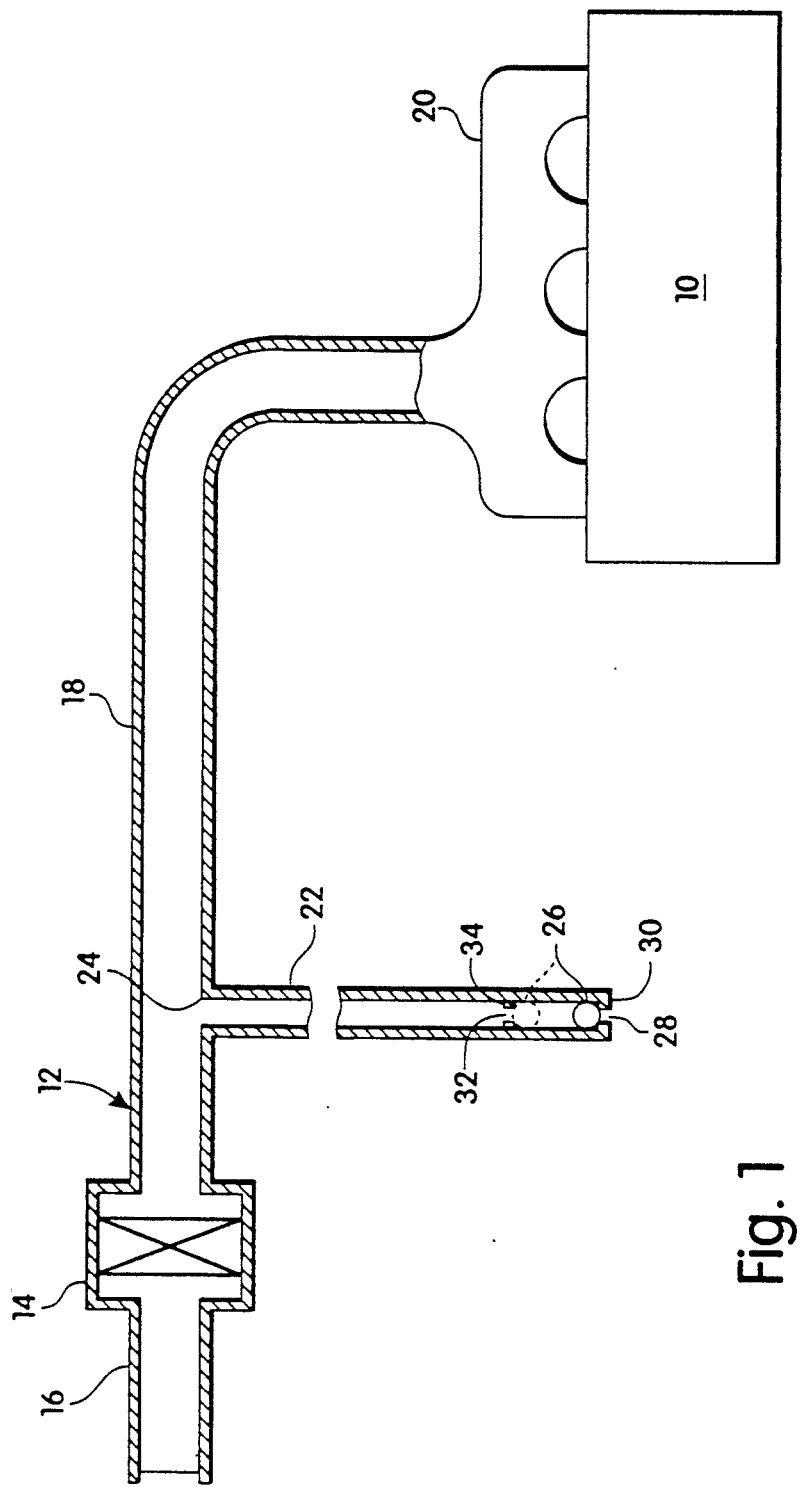
FIG. 1 is a schematic sectional view of an air induction system for an internal combustion engine, comprising a noise attenuation device in accordance with a preferred embodiment of the invention.

It should be understood that the drawings are not to scale and that directional terms used herein, unless the contrary is made clear by statement or context, are for purposes of description of the drawings and are not intended to limit the scope of the invention.

DETAILED DESCRIPTION OF CERTAIN PREFERRED EMBODIMENTS

The general operation of a quarter-wave tube for noise attenuation is known to those skilled in the art. A quarter-wave tube of given dimensions, having a first open end in fluid communication with an air intake passage or the like, will attenuate noise at a given frequency range. Holding other dimensions constant, lengthening or shortening the tube will cause it to attenuate noise at a lower or higher frequency range, respectively. In accordance with the present invention, a quarter-wave tube employed in a noise attenuation device for an air induction system, although having fixed dimensions including length, is provided multiple "effective lengths" by virtue of a moveable tuning body mounted within the quarter-wave tube. The effective length is the length of the quarter-wave tube between the open first end and the movable tuning body. As discussed further below, in certain preferred embodiments at least one effective length of the quarter-wave tube is a zero length to substantially deactivate the noise attenuation. Those skilled in the art will recognize that the moveable tuning body should generally have a cross-sectional shape and dimension substantially the same as the inside shape and dimension of the quarter-wave tube, allowing clearance for free axial movement of the tuning body within the quarter-wave tube.

The second end of the quarter-wave tube, that is, the distal end (opposite the open first end), preferably is in direct fluid communication with the atmosphere, meaning communication without intervening valves or passageways or the like. Typically, such direct fluid communication is provided by a simple hole in an end wall otherwise closing such distal end of the quarter-wave tube. Advantageously, such fluid communication hole may double as a drain hole, particularly for quarter-wave tubes extending downwardly from an air intake passage. In certain preferred embodiments, the drain hole may be centrally located in the distal end wall and serve as a seat to receive a spherical tuning body, thus establishing one position of the tuning body within the quarter-wave tube.

In the case of a noise attenuation device for an air induction system of an internal combustion engine of a motor vehicle, a "significant frequency" typically is a noise frequency readily perceptible to the motor vehicle operator under normal operating conditions at a certain engine operating level. Such significant frequency may be undesirable, at least under a particular range of operating conditions, in view of its tonal quality, sound pressure level or both. The term engine operating level is not necessarily limited to engine speed. Various atmospheric conditions, such as barometric pressure, may impact the functioning of the noise attenuation device.

The vacuum controlled noise attenuation device of the invention can be implemented in an air induction system of an internal combustion engine as an effective and cost efficient means for variable noise reduction. It can provide air induction noise attenuation at more than one frequency range with a single quarter-wave tube, which is particularly useful for air induction systems having an undesirable tonal quality or like noise problem at two (or more) distinct frequency ranges generated at two (or more) corresponding different engine operating levels. In addition, the movable tuning body within the quarter-wave tube can be implemented in certain preferred embodiments to enable the quarter-wave tuner to be turned on and off at particular engine operating levels. This may be particularly beneficial in applications where the noise attenuation device, although effective to attenuate a dominant noise frequency at one engine operating level, is ineffective or counter-effective at other engine operating levels.

The vacuum or pressure drop created between a first point ("P1") and a second point ("P2") within an air intake passage of an air induction system can be estimated to a first approximation from the one dimensional energy equation:

$$\frac{P_1}{\rho g} + \frac{V_1^2}{2g} + Z_1 = \frac{P_2}{\rho g} + \frac{V_2^2}{2g} + Z_2 - h_f$$

Assuming that friction and potential energy losses near the air inlet are negligible, rearranging the energy equation yields the following equation:

$$P_2 - P_1 = \rho(V_1^2 - V_2^2)/2$$

If the second point ("P2") is taken to be outside the air induction system air inlet, then it may be assumed to be at atmospheric pressure and zero velocity. The energy equation above will then approximate the pressure difference existing between the atmosphere and the air intake passage of the air induction system. It is this pressure difference which is employed in the present invention, optionally in conjunction with gravity and/or biasing force, as discussed further below, to move a tuning body within a quarter-wave tube of a noise attenuation devices to change the frequency range at which the noise attenuation device operates and/or to deactivate the device.

A light sphere, for example, an optionally hollow plastic ball, forming a sliding fit within a quarter-wave tube (see, e.g., FIG. 1, discussed further below) will be at equilibrium at the bottom of a quarter-wave tube extending downwardly from an air intake passage if its weight exceeds the net pressure differential between atmosphere and the air intake tube. When the pressure differential is sufficient to overcome the weight of the ball, the ball will move upwardly until it encounters a stop or seat. This will tune the quarter-wave tube to a higher frequency. In this regard, it will be understood by those skilled in the art that the average velocity of air within an air intake passage is a function of engine speed, generally in accordance with the following equation: $V = [n \cdot e_v \cdot d]/2A$ where: $V$ = average velocity; $n$ = engine speed; $e_v$ = volumetric efficiency; $d$ = engine displacement; and $A$ = cross-sectional area of the air intake passage at the velocity measurement point. This velocity equation may be used with the aforesaid energy equation to estimate the pressure differential acting on a moveable tuning body within a quarter-wave tube in fluid communication with the air intake passage. The pressure force exerted on the tuning body will be equal to the pressure difference multiplied by the cross-sectional area of the tuning body measured in a plane normal to the longitudinal axis of the quarter-wave tube. Thus, the engine operating level needed to lift a tuning body of a given weight and cross-section can be determined. Therefore, the weight of the tuning body can be readily calibrated by those skilled in the art, such that it will move at a preselected engine operating level to perform the desired on/off function or the desired change of attenuation frequency function.

Referring now to FIG. 1, an internal combustion engine 10 and its associated air induction system 12 are illustrated. The air induction system 12 comprises air cleaner 14 in fluid communication with the atmosphere via air intake passage 16. Air intake passage 18 extends between air cleaner 14 and engine intake manifold 20. A noise attenuation device for the air induction system 12 comprises quarter-wave tube 22 extending downwardly from air intake passage 18 mediate the air cleaner 14 and air intake manifold 20. The device also can be located upstream of the air cleaner to prevent introduction of moisture, etc., into intake passage 18. Quarter-wave tube 22 has an open first end 24 in fluid communication with air intake passage 18. A spherical tuning body 26 is movably mounted within the quarter-wave tube 22. With the engine either not operating or at a low operating condition, the weight of tuning body 26 causes it to be seated in axially centered, circular hole 28 in distal end wall 30 of quarter-wave tube 22. This establishes a first effective length for the quarter-wave tube, at which the noise attenuation device will attenuate air induction noise at a certain frequency range. It will be quite apparent to those skilled in the art that the effective length of the quarter-wave tube can be readily determined for attenuating a particular frequency range which is significant at such first engine operating level.

The size and weight of the spherical tuning body 26 can also be readily determined, such that it will rise within quarter-wave tube 22 at a preselected higher engine operating level at which the pressure differential acting on the tuning body, that is, the difference between atmospheric pressure and the sub-atmospheric pressure within the air intake passage 18, overcomes the weight of the tuning body. In the embodiment of FIG. 1, the tuning body will rise until it is seated in axially centered, circular hole 32 formed by annular wall 34 extending radially inward from the inside surface of quarter-wave tube 22. The axial position of annular wall 34 can be readily determined by those skilled in the art in view of the present disclosure to establish a second operative or effective length for the quarter-wave tube to attenuate noise at a second frequency which is significant at such second, higher operating level. Tuning body 26 will simply fall of its own weight back to the first position at end wall 30 when the engine operating level falls back again below such second, higher operating level.

Figure 2:
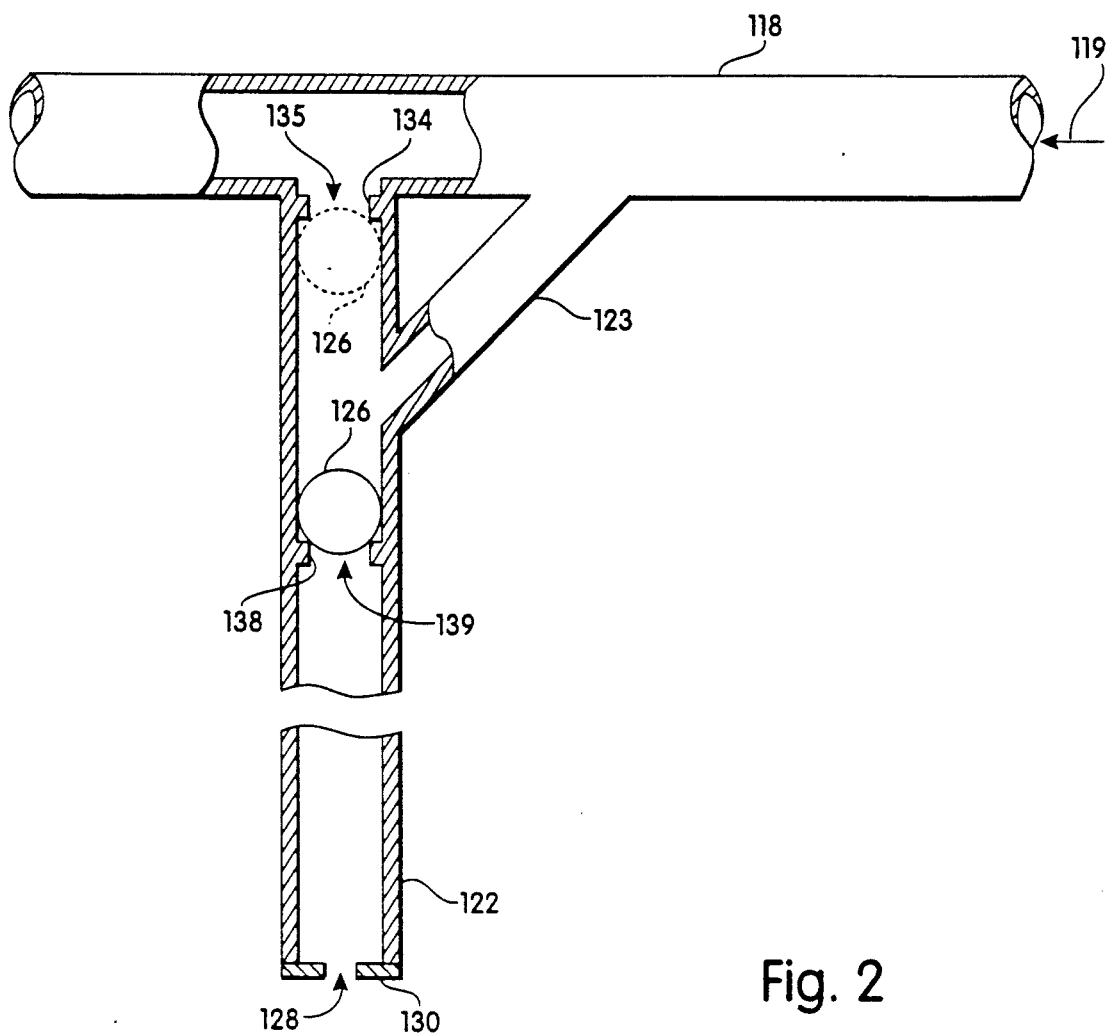
FIG. 2 is a schematic sectional view of a noise attenuation device for an air induction system in accordance with a second preferred embodiment of the invention, wherein the tuning body is positionable within the quarter-wave tube to substantially deactivate the noise attenuation device.

A second preferred embodiment of a noise attenuation device for an air induction system of an internal combustion system is illustrated in FIG. 2. The noise attenuation device comprises a quarter-wave tube 122 extending downwardly from air intake passageway 118. Air flow in air intake passageway 118 is in the direction of arrow 119. End wall 130 is seen to have a drain hole 128. A radially centered annular wall 134, defines circular hole 135 in open fluid communication with air intake passage 118 which forms a seat to receive spherical tuning body 126 (shown in phantom at such first position). A side branch air passage 123 extends from the open first end of the quarter-wave tube to open fluid communication with the main body of the quarter-wave tube 122. Specifically, passage 123 intersects the quarter-wave tube mediate the first position of tuning body 126 at radial wall 134 and a second position of the tuning body. When the tuning body is in the aforesaid first position, the quarter-wave tube operates to attenuate noise at a preselected frequency, via air passageway 123.

The second position of the tuning body is defined by a second radially centered annular wall 138 extending radially inward from the inside surface of the quarter-wave tube in a plane normal to the axis of the tube. Annular wall 138 defines circular opening 139 which forms a second seat for tuning body 126. Such second position is proximate the open first end of the quarter-wave tube. That is, with the tuning body seated in such second position the quarter-wave tube is substantially deactivated.

In accordance with the principals of the invention previously discussed, those skilled in the art will recognize that at a sufficiently high engine operating level the pressure differential acting on tuning body 126 will lift it to its first position at radial wall 134. At lower engine operating levels, tuning body 126 will be seated in its second position at radial wall 138, thereby substantially deactivating noise attenuation by the quarter-wave tube. Annular wall 138, forming a seat for the spherical tuning body 126, should have sufficiently small radial dimension to avoid undue interference with the operation of the quarter-wave tube at its full operative length.

Figure 3:
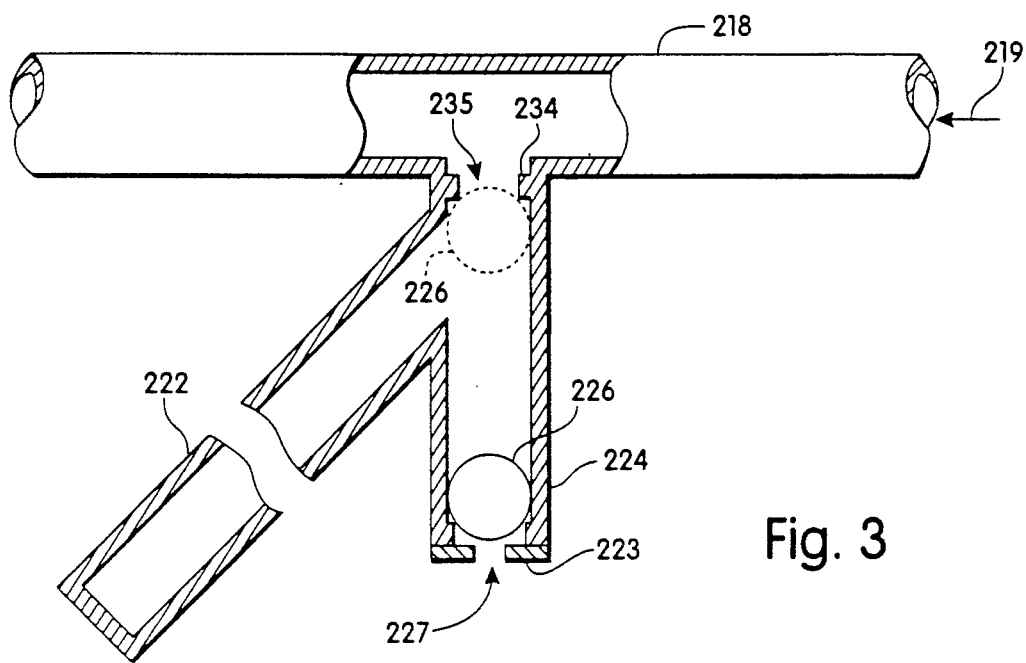
FIG. 3 is a schematic sectional view of a noise attenuation device in accordance with a third preferred embodiment of the invention, wherein the tuning body is positionable within the quarter-wave tube to substantially deactivate the noise attenuation device.

Another preferred embodiment of the invention is illustrated in FIG. 3 wherein, as in the embodiment of FIG. 2, the tuning body operates as an on/off switch for noise attenuation by the quarter-wave tube of the noise attenuation device. In contrast to the embodiment of FIG. 2, in the embodiment of FIG. 3 the quarter-wave tube is deactivated at a higher, rather than lower engine operating level. In the embodiment of FIG. 3, quarter-wave tube 222 is seen to intersect air intake passageway 218 of an air induction system. Air intake is in the direction of arrow 219. Annular wall 234 defines radially centered, circular hole 235, forming a seat at the open first end of quarter-wave tube 222 for tuning body 226. With the tuning body in this position, it will be readily seen that the quarter-wave tube is substantially deactivated. A preselected engine operating level must be maintained to lift tuning body 226 into such position against the force of gravity. Below such engine operating level, tuning body 226 will fall to side branch 224, which forms a well 223 to receive the tuning body. Well 223 is seen to have drain hole 227 which serves also to provide direct fluid communication to atmosphere.

Figure 4:
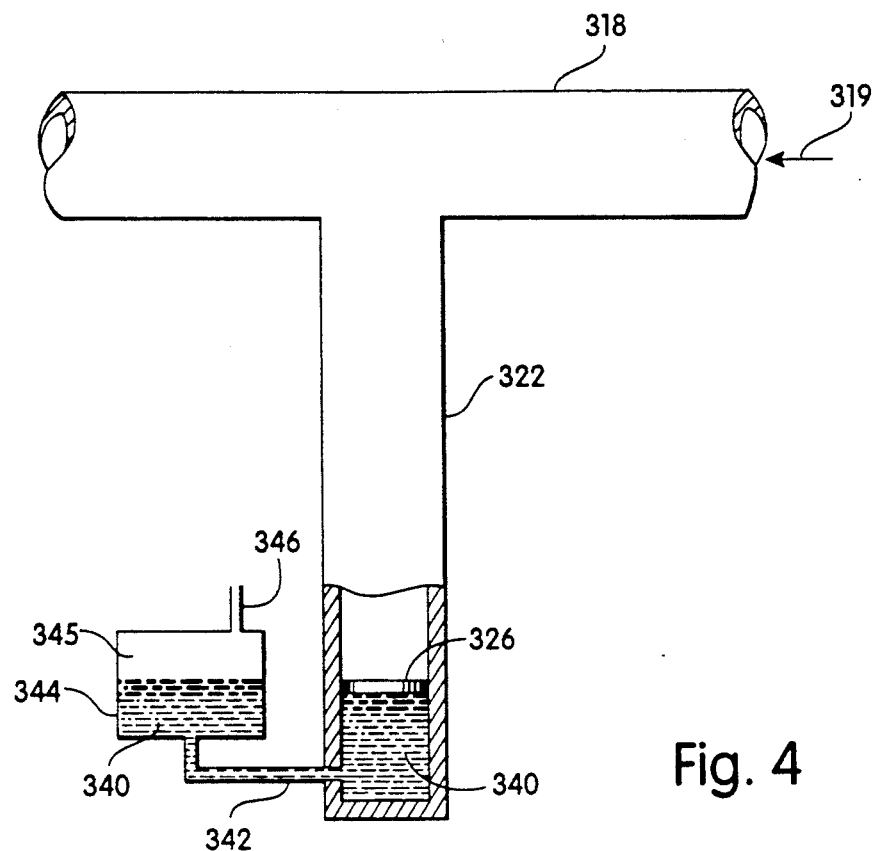
FIG. 4 is a schematic sectional view of a fourth preferred embodiment of the invention wherein the tuning body is continuously movable within a range of positions within the quarter-wave tube.

In the embodiment of FIG. 4, a noise attenuation device in accordance with the principles of the present invention employs a piston 326 as the tuning body. Piston 326 has a fluid-tight sliding fit within quarter-wave tube 322. Above piston 326, the quarter-wave tube is in open fluid communication with air intake passageway 318. Air flow within passageway 318 is in direction of arrow 319. Below piston 326, the quarter-wave tube is filled with fluid 340 exposed to the pressure differential between the atmosphere and the air intake passage, supplied via conduit 342 from a reservoir 344. Reservoir 344 comprises a fluid holding tank in which the space 345 over the fluid 340 is in direct fluid communication with the atmosphere via vent 346. In this embodiment of the invention, the height of piston 326 within the quarter-wave tube can vary continuously as a function of vacuum or pressure drop established by the air induction system. As discussed above, the pressure drop within the air induction system is a function of engine operating level. Movement of the piston within the quarter-wave tube will establish a continuously variable operative length for the quarter-wave tube over a range of positions. Hence, the noise attenuation device of FIG. 4 functions to attenuate air induction noise at a frequency which varies continuously with engine operating level.

Figure 5:
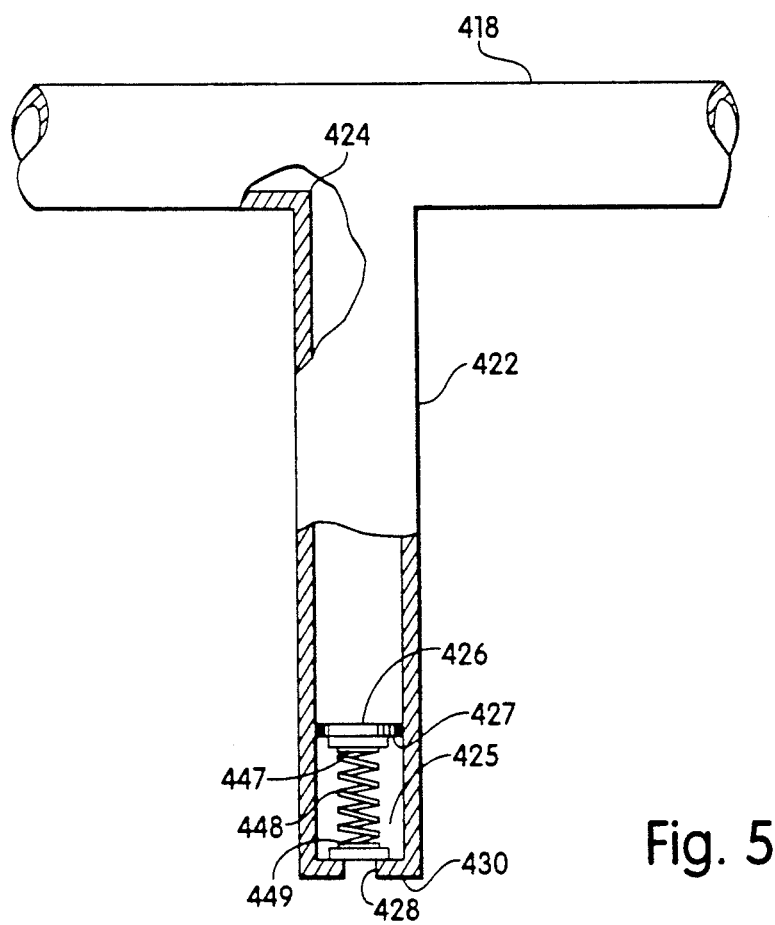
FIG. 5 is a schematic sectional view of a noise attenuation device in accordance with a fifth preferred embodiment of the invention wherein the tunable body is continuously movable within a range of positions within the quarter-wave tube.

Another preferred embodiment of the invention is illustrated in FIG. 5, wherein the tuning body again comprises a piston slidably mounted for axial movement within the quarter-wave tube. Biasing means are provided for applying an axially directed force to the tuning body. The magnitude of the axially directed force varies substantially continuously over an operative range of axial position of the piston. More specifically, piston 426 is seen to be slidably mounted within quarter-wave tube 422 extending downwardly from air intake passageway 418. Quarter-wave tube 422 has an open first end 424 in fluid communication with air passageway 418. The distal end 425 of quarter-wave tube 422, opposite the open first end 424, is substantially closed by end wall 430. A drain hole 428 is provided in end wall 430, which also ensures substantially atmospheric pressure acting on the downward side 427 of piston 426. A first end 447 of a helical spring 448 is attached to the bottom face 427 of piston 426. The opposite end 449 of helical spring 448 is attached to end wall 430 of quarter-wave tube 422. The biasing force applied to piston 426 will be understood from this arrangement to vary continuously with axial position of the piston within the quarter-wave tube, as the helical spring is increasingly stretched or compressed. Thus, as in the embodiment of FIG. 4, the effective or operative length of the quarter-wave tube 442 will vary continuously with the pressure drop in the air induction system. In accordance with the general principals of the invention set forth above, those skilled in the art will understand that a noise attenuation device in accordance with the embodiment of the invention illustrated in FIG. 5 will attenuate noise at a frequency which varies continuously with the engine operating level over a range of such operating levels. With the aid of the present disclosure, it is well within the ability of those skilled in the art to configure and dimension the quarter-wave tube and the other components of the noise attenuation device to attenuate undesirable noise at different significant frequencies at various corresponding engine operating levels.

The exemplary and preferred embodiments of the invention described above are intended to illustrate and not limit the invention which is defined by the appended claims. It will be apparent to those familiar with the technology to which this invention relates, in light of this disclosure, that variations and modifications can be made without departing from the true spirit of the invention. All such variations and modifications are intended to be included within the scope of the appended claims.

I claim:

1. A noise attenuation device for an air induction system for an internal combustion engine, comprising:

a quarter-wave tube having an open first end for fluid communication with an air intake passage of the air induction system; and a tuning body movable within the quarter-wave tube by vacuum developed within the air induction system during operation of the internal combustion engine, from a first position establishing a first operative length for the quarter-wave tube effective to attenuate noise at a first frequency range at a first operating level of the internal combustion engine, to a second position corresponding to a second operating level of the internal combustion engine.

2. The noise attenuation device of claim 1 wherein the second position establishes a second operative length for the quarter-wave tube effective to attenuate noise at a second frequency range.

3. The noise attenuation device of claim 1 wherein the tuning body is an unattached sphere having an outside diameter which allows axial movement of the sphere within the quarter-wave tube.

4. The noise attenuation device of claim 3 wherein a second end of the quarter-wave tube is partially closed by an endwall having a radially centered circular hole for direct fluid communication with the atmosphere, the end wall forming a first seat to receive the sphere in said first position.

5. The noise attenuation device of claim 4 wherein a radially centered annular wall within the quarter-wave tube, mediate the open first end and the second end, forms a second seat to receive the sphere in said second position.

6. The noise attenuation device of claim 1 wherein the tuning body in said second position substantially deactivates noise attenuation by the quarter-wave tube.

7. The noise attenuation device of claim 6 wherein the tuning body is an unattached sphere having an outside diameter which allows axial movement within the quarter-wave tube, a first radially centered annular wall at the open first end forming a first seat to receive the sphere in said first position, and a second radially centered annular wall within the quarter-wave tube proximate the open first end forming a second seat to receive said sphere in said second position, a side branch air passage having open fluid communication with said air intake package extending to open fluid communication with the quarter-wave tube mediate the first position and the second position.

8. The noise attenuation device of claim 6 wherein the tuning body is an unattached sphere having an outside diameter which allows axial movement within the quarter-wave tube, a side branch extending from the quarter-wave tube proximate the first open end forming a well to receive the sphere in said first position, and a radially centered annular wall at the open first end forming a seat to receive the sphere in said second position.

9. The noise attenuation device of claim 1 further comprising a biasing means for applying an axially directed force to the tuning body.

10. The noise attenuation device of claim 9 wherein the magnitude of the axially directed force varies substantially continuously with axial position of the tuning body.

11. The noise attenuation device of claim 10 wherein the biasing means comprises a helical spring having one spring end attached to an end wall of the quarter-wave tube opposite the open first end thereof, and a second spring end attached to the tuning body.

12. The noise attenuation device of claim 10 wherein the tuning body is a piston having a fluid-tight sliding fit within the quarter-wave tube and the biasing means comprises fluid within the quarter-wave tube acting against a surface of the piston, the fluid being supplied under force of gravity from a vented fluid reservoir.

13. An air induction system for an internal combustion engine comprising:
   air intake conduit means for passing combustion air from the atmosphere to the engine; and
   a quarter-wave tube having an open first end in fluid communication with an air intake passage of the air intake conduit means, and a tuning body axially movable within the quarter-wave tube by vacuum developed within the air induction system during operation of the engine, from a first position establishing a first operative length for the quarter-wave tube corresponding to a first engine operating level, to a second position corresponding to a second engine operating level.

14. The air induction system of claim 13 wherein the air intake passage extends from an air cleaner to an intake manifold for the engine.

15. The air induction system of claim 14 wherein the quarter-wave tube extends downwardly from the air intake passage, gravity exerting a downward force on the tuning body and vacuum within the air intake passage exerting an opposed upward force on the tuning body during operation of the engine.

16. The air induction system of claim 15 further comprising biasing means for exerting a biasing force on the tuning body.

* * * * *